US012587738B2

(12) United States Patent
Lee

(10) Patent No.: US 12,587,738 B2
(45) Date of Patent: Mar. 24, 2026

(54) CAMERA MODULE DRIVING APPARATUS AND DEVICE INCLUDING CAMERA MODULE

(71) Applicant: SAMSUNG ELECTRO-MECHANICS CO., LTD., Suwon-si (KR)

(72) Inventor: Youn Joong Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 228 days.

(21) Appl. No.: 18/341,992

(22) Filed: Jun. 27, 2023

(65) Prior Publication Data

US 2024/0107158 A1 Mar. 28, 2024

(30) Foreign Application Priority Data

Sep. 27, 2022 (KR) ........................ 10-2022-0122640

(51) Int. Cl.
*H04N 23/60* (2023.01)
*H04N 25/709* (2023.01)

(52) U.S. Cl.
CPC ......... *H04N 23/665* (2023.01); *H04N 25/709* (2023.01)

(58) Field of Classification Search
CPC .... H04N 23/665; H04N 25/709; H04N 23/65; H04N 23/57; H04N 23/54; H04N 23/55; H02M 3/02; H03K 19/018521
(Continued)

(56) References Cited

U.S. PATENT DOCUMENTS

2009/0073148 A1    3/2009  Hsueh
2011/0037509 A1*   2/2011  Herzer ........... H03K 19/018521
                                                327/333
(Continued)

FOREIGN PATENT DOCUMENTS

JP        2003-198358  A      7/2003
JP         2003198358       *  7/2003   ......... H03K 19/0185
(Continued)

OTHER PUBLICATIONS

Korean Office Action issued on Apr. 11, 2024, in counterpart Korean Patent Application No. 10-2022-0122640 (9 pages in English, 6 pages in Korean).

*Primary Examiner* — Lin Ye
*Assistant Examiner* — Chan T Nguyen
(74) *Attorney, Agent, or Firm* — NSIP Law

(57) ABSTRACT

A camera module driving apparatus includes: a camera module driving IC including a communication port and a driving port; an interface to receive a communication signal through the communication port; and a driver to output a driving current through the driving port and including driving semiconductor circuit elements coupled in a bridge structure. The interface includes an inverter including a high-voltage terminal, a low-voltage terminal, and an input terminal and operating based on a voltage difference between the high-voltage terminal and the low-voltage terminal, and inverting at least a portion of the communication signal; and an input semiconductor circuit element passing current from the input terminal to the high-voltage terminal and cutting-off the current from the high-voltage terminal to the input terminal. The high-voltage terminal and the low-voltage terminal of the inverter are electrically connected to both ends of a capacitor, respectively.

18 Claims, 8 Drawing Sheets

(58) Field of Classification Search
USPC ........................................................ 348/294
See application file for complete search history.

(56) References Cited

U.S. PATENT DOCUMENTS

| | | | |
|---|---|---|---|
| 2011/0298493 A1 | 12/2011 | Kurita et al. | |
| 2020/0052641 A1* | 2/2020 | Weinmann | H02P 23/26 |
| 2021/0096389 A1* | 4/2021 | Kim | H04N 23/6812 |
| 2023/0234144 A1* | 7/2023 | Koda | C23C 16/0272 |
| | | | 407/119 |

FOREIGN PATENT DOCUMENTS

| | | | |
|---|---|---|---|
| JP | 2009-17546 A | 1/2009 | |
| JP | 2011-259018 A | 12/2011 | |
| KR | 10-2010-0108073 A | 10/2010 | |
| KR | 10-2021-0038186 A | 4/2021 | |

* cited by examiner

CAMERA MODULE DRIVING APPARATUS AND DEVICE INCLUDING CAMERA MODULE

CROSS-REFERENCE TO RELATED APPLICATION(S)

This application claims the benefit under 35 USC 119(a) of Korean Patent Application No. 10-2022-0122640 filed on Sep. 27, 2022 in the Korean Intellectual Property Office, the entire disclosure of which is incorporated herein by reference for all purposes.

BACKGROUND

Field

The following description relates to a camera module driving apparatus and a device including a camera module.

Description of the Background

In general, a device may include a camera, such as a camera module, for which a position of a lens thereof needs to be controlled, and the position of the lens that can be included in the camera module may be controlled through a driving signal.

An Integrated Circuit (IC) may be provided to generate the driving signal. The importance of reducing power consumption of the IC and miniaturization/simplification of the IC is gradually increasing.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module driving apparatus includes: a camera module driving IC including a communication port and a driving port; an interface configured to receive a communication signal through the communication port in the camera module driving IC; and a driver configured to output a driving current through the driving port in the camera module driving IC and including driving semiconductor circuit elements coupled in a bridge structure. The interface includes an inverter including a high-voltage terminal, a low-voltage terminal, and an input terminal and configured to operate based on a voltage difference between the high-voltage terminal and the low-voltage terminal, and to invert at least a portion of the communication signal input from the input terminal; and an input semiconductor circuit element configured to pass current from the input terminal of the inverter to the high-voltage terminal and to cut off the current from the high-voltage terminal to the input terminal. The high-voltage terminal and the low-voltage terminal of the inverter are electrically connected to both ends of a capacitor, respectively.

The camera module driving IC may include a power port configured to receive IC power, and the inverter may be separated from the power port and configured to operate based on self-generated power from at least a portion of the communication signal.

The interface may include a level shifter configured to convert a voltage level of an output signal of the inverter, and the driver and the level shifter may be configured to operate based on IC power supplied through the power port.

A voltage of the self-generated power by the inverter may be lower than a voltage of the IC power.

The camera module driving apparatus may include a digital controller configured to control the driver based on at least a portion of the communication signal; and an additional power generator configured to generate additional power based on the IC power in the camera module driving IC, and the digital controller may be configured to operate based on the additional power.

At least a portion of the communication signal may have a pulse waveform.

The camera module driving apparatus may include a digital controller configured to control the driver based on at least a portion of the communication signal.

The communication signal may be configured based on at least one of inter-integrated circuit (I2C), serial peripheral interface (SPI), mobile industry processor interface (MIPI), and general purpose input/output (GPIO).

The interface may be configured to receive the communication signal output from at least two of a processor, an image sensor, and a gyro sensor, on an external side of the camera module driving IC.

In another general aspect, a camera module driving apparatus includes: a camera module driving IC including a communication port, a driving port and a power port; an interface configured to receive a communication signal through the communication port in the camera module driving IC; and a driver configured to output a driving current through the driving port in the camera module driving IC and including driving semiconductor circuit elements coupled in a bridge structure. The interface includes an inverter configured to invert at least a portion of the communication signal; and a level shifter configured to convert a voltage level of an output signal of the inverter. The driver and the level shifter are configured to operate based on IC power supplied through the power port, and the inverter is separated from the power port and configured to operate based on self-generated power from at least a portion of the communication signal.

In another general aspect, a device may include: the camera module driving apparatus; a camera module including a lens, a position of which is controlled based on a driving current of the camera module driving apparatus; an image sensor configured to generate an image by receiving light passing through the lens; and a processor configured to receive the image from the image sensor. The camera module driving apparatus configured to receive IC power, and at least one of the processor and the image sensor configured to transmit the communication signal to the camera module driving apparatus.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

Figure 1A:
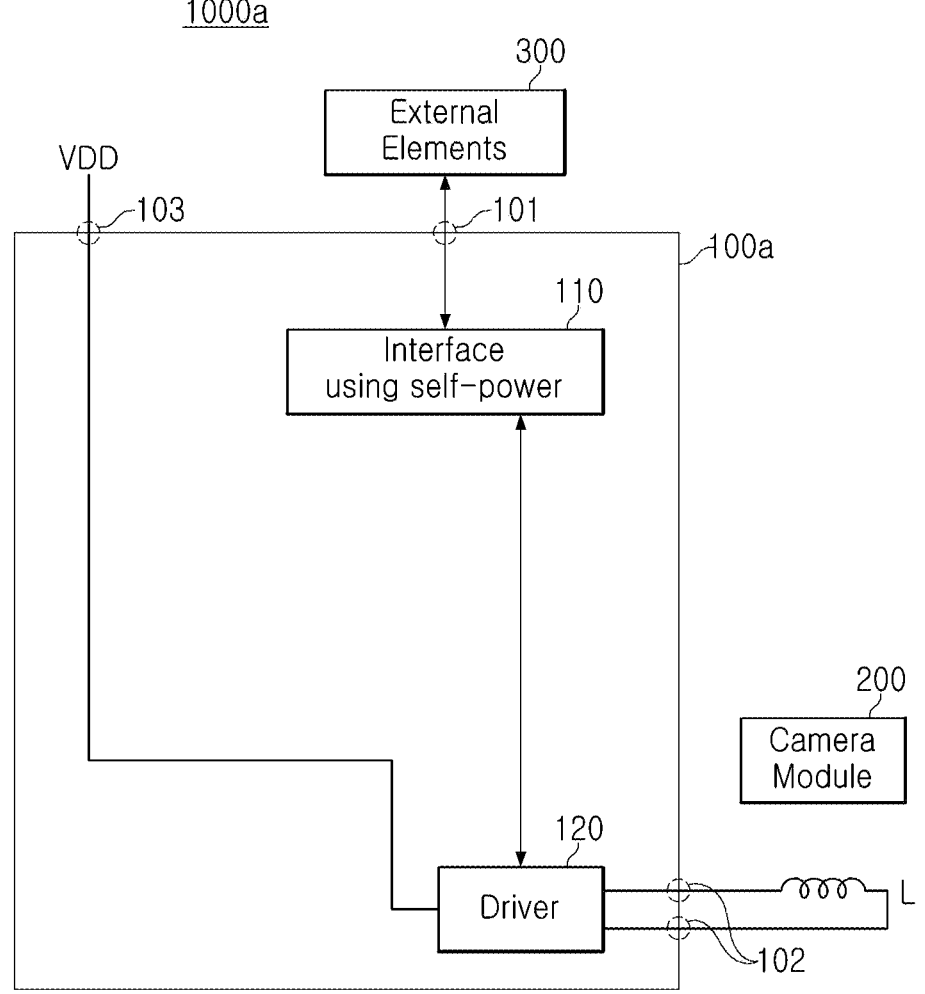
FIGS. 1A and 1B are diagrams illustrating a camera module driving apparatus according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

Figure 1B:
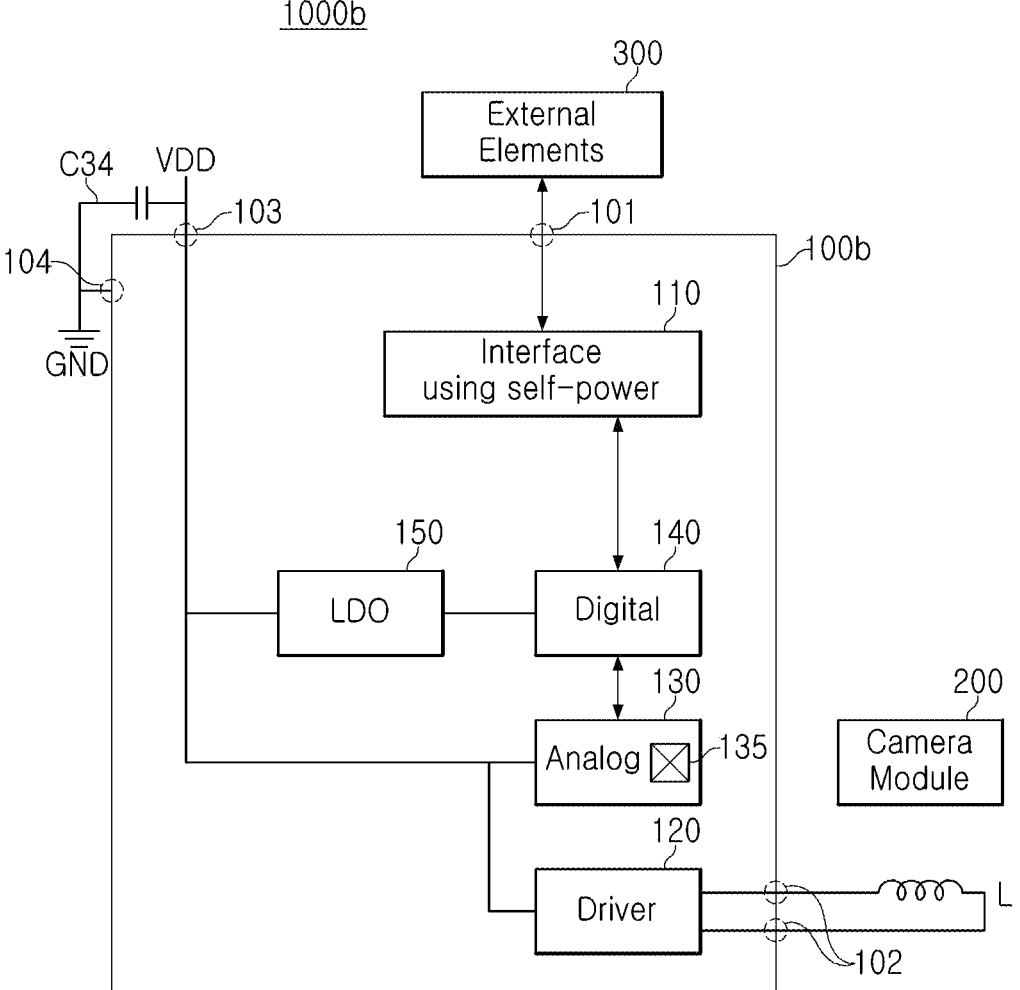

Referring to FIGS. 1A and 1B, camera module driving apparatuses 1000a and 1000b may include camera module driving ICs 100a and 100b, an interface 110, and a driver 120.

The camera module driving ICs 100a and 100b may include at least a portion of a communication port 101, a driving port 102, and a power port 103. For example, the communication port 101, the driving port 102, and the power port 103 may be implemented as pins or pads disposed on a typical semiconductor chip as electrical paths.

The communication port 101 may be an electrical path through which communication signals transmitted and received between the camera module driving ICs 100a and 100b and external elements 300. For example, the external elements 300 may be at least one of a processor, an image sensor, and a gyro sensor disposed in a device. For example, the interface 110 may receive a communication signal output from at least two (corresponding to the external elements 300) of a processor, an image sensor, and a gyro sensor disposed on an external side of the camera module driving ICs 100a and 100b.

The driving port 102 may be electrically connected to a driving coil L disposed on an external side of the camera module driving ICs 100a and 100b, and may be an electrical path through which a driving current flows. When a driving current flows through the driving coil L, the driving coil L may form a magnetic field, and a position of the lens of a camera module 200 may be controlled by Lorentz force based on the magnetic field.

For example, the IC power supply (VDD) may be generated by a power management integrated circuit (PMIC) disposed in the device, may be a relatively high voltage (e.g. 2.8V), and may be a main power for the camera module driving ICs 100a and 100b, and may be used as energy required for multiple operations of the camera module driving Ics 100a and 100b.

The interface 110 may receive a communication signal through the communication port 101 within the camera module driving Ics 100a and 100b. For example, the interface 110 may be implemented as I/O (Input/Output) of a general integrated circuit, and the communication signal may be configured based on at least one of an inter-integrated circuit (I2C), a serial peripheral interface (SPI), a mobile industry processor interface (MIPI) and general purpose input/output (GPIO).

For example, using a communication signal received through the interface 110, the camera module driving ICs 100a and 100b are synchronized with the external elements 300, receive information required for determining a target position of the lens of the camera module 200 through a processor of the external elements 300, receive feedback information from an image sensor of the external elements 300, or receive acceleration information required for determining a driving current flowing through the driving coil L from a gyro sensor of the external elements 300.

For example, at least a portion of the communication signal received through the interface 110 may be a pulse waveform. As a voltage level (high voltage) of the pulse waveform is lowered, power consumption of the interface 110 may decrease, and power consumption of the external elements 300 may also decrease.

The driver 120 may output a driving current through the driving port 102 within the camera module driving ICs 100a and 100b. Referring to FIG. 2C, the driver 120 may include driving semiconductor circuit elements MN1, MN2, MP1, and MP2 coupled in a bridge structure, generate a driving current based on gate terminals LNG, RNG, LPG, and RPG, and output the driving current to the driving coil L. The driving semiconductor circuit elements MN1, MN2, MP1, and MP2 of the driver 120 may operate based on IC power VDD and a ground GND supplied through the power port. For example, the bridge structure may be one of an H-bridge, a half-bridge and a full-bridge.

Referring back to FIGS. 1A and 1B, the driving current may be used to form a magnetic field of the driving coil L, and may be used to control a position of a lens of the camera module 200. The higher the maximum driving current, the wider the control range (so-called, a dynamic range) of the lens of the camera module 200 may be, the more quickly the position of the lens of the camera module 200 may be controlled, and the more advantageous it may be to improve the control stability of control engineering.

Therefore, an optimum voltage of the power of the driver 120 may be higher than an optimum voltage of the power of the interface 110. When a voltage of the power of the driver 120 and a voltage of the power of the interface 110 are different from each other, power efficiency of the camera module driving ICs 100a and 100b may be higher.

The interface 110 may use self-power generated from at least a portion of the communication signal. Accordingly, while the voltage of the power of the driver 120 and the voltage of the power of the interface 110 may be different from each other, the number of power ports 103 increases or a circuit generating power of the interface 110 (e.g., a Low Dropout circuit) may be prevented from being added, and an increase in the number of power ports 103 or an increase in the size of the camera module driving ICs 100a and 100b due to the addition of the circuit may be prevented.

In addition, since the voltage of the power of the interface 110 may be affected by the external elements 300, the possibility that the voltage of the power of the interface 110 may vary depending on the specific design of the external elements 300 in the device may be relatively higher than the power of the driver 120.

The interface 110 may use self-power generated from at least a portion of the communication signal. Accordingly, even if a voltage level of the communication signal is changed, the need to receive additional information for determining the changed voltage level from the external elements 300 may be eliminated, and a process of verifying whether or not the interface 110 is operating properly based on a power corresponding to the changed voltage level may also be omitted.

Figure 2A:
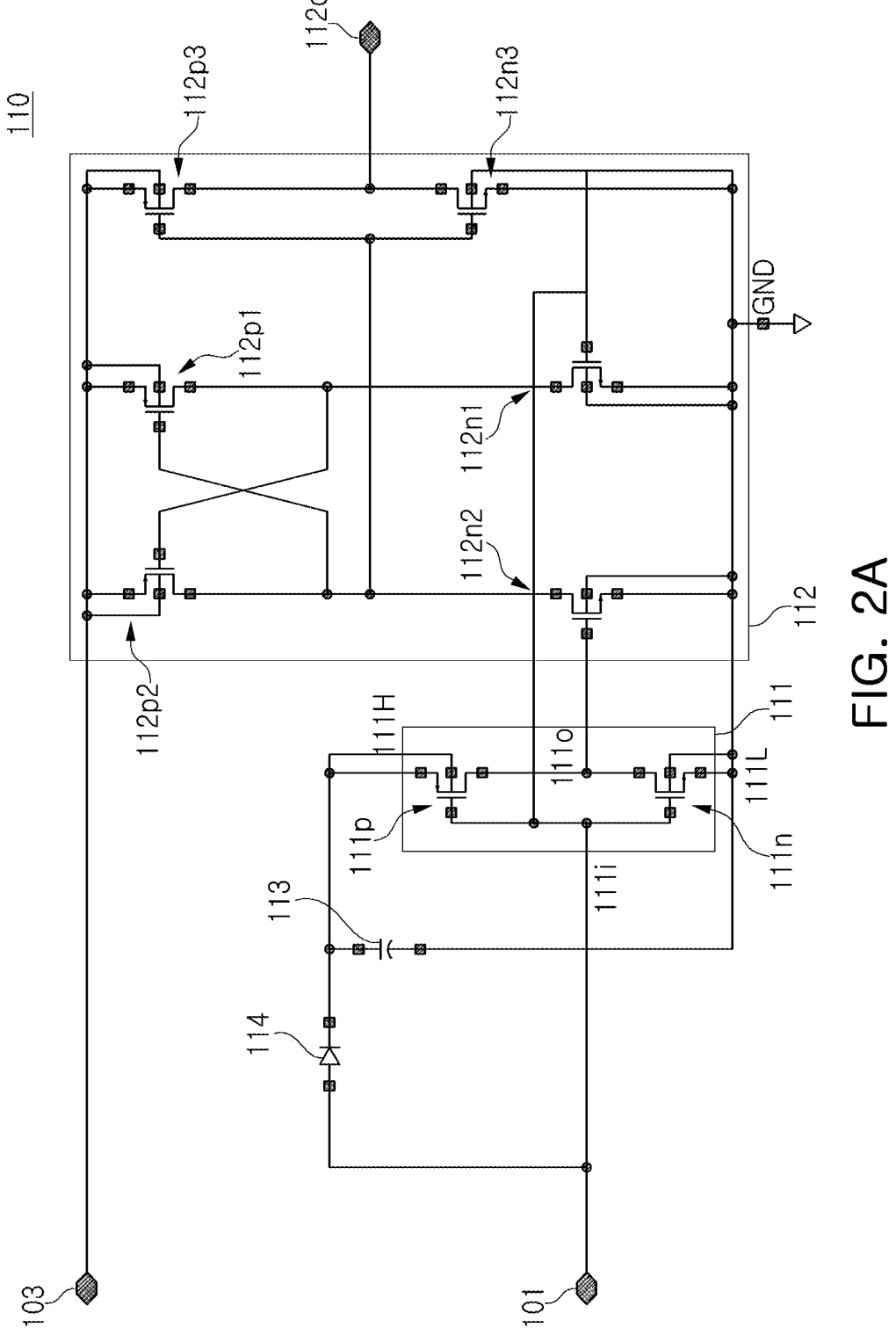
FIG. 2A is a circuit diagram illustrating an interface that may be included in an example.

Referring to FIG. 2A, the interface 110 may include at least one of an inverter 111, a level shifter 112, a capacitor 113, and an input semiconductor circuit element 114.

The inverter 111 may include a high-voltage terminal 111H, a low-voltage terminal 111L, and an input terminal 111i, operate based on a voltage difference between the high-voltage terminal 111H and the low-voltage terminal 111L, and may invert at least a portion of a communication signal input from the input terminal 111i. For example, the inverter 111 may output an output signal to the level shifter 112 through an output terminal 111o, a drain terminal of an N-type transistor 111n and a P-type transistor 111p, and may be disposed in the module driving IC.

Since the inverter 111 may be disconnected from the power port 103, a voltage difference between the high-voltage terminal 111H and the low-voltage terminal 111L may be lower than a voltage difference between the voltage of the IC power of the power port 103 (e.g., 2.8V) and a ground.

The input semiconductor circuit element 114 may pass current from the input terminal 111i of the inverter 111 to the high-voltage terminal 111H and block the current from the high-voltage terminal 111H to the input terminal 111i. For example, the input semiconductor circuit element 114 may be implemented as a diode or a transistor having a gate terminal and a drain terminal connected thereto, and may be disposed in a camera module driver IC.

The high-voltage terminal 111H and the low-voltage terminal 111L of the inverter 111 may be electrically connected to both ends of a capacitor 113, respectively. The capacitor 113 may be disposed within the camera module driver IC, but the configuration is not limited thereto. For example, the capacitor 113 may be a capacitor component (e.g., a multilayer ceramic capacitor) disposed outside the camera module driver IC according to a design.

When the voltage of the communication signal is a high voltage, the input semiconductor circuit element 114 may pass current, and the capacitor 113 can be charged. Therefore, the voltage at both ends may correspond to the voltage level (high voltage) of the communication signal, and a voltage difference between the high-voltage terminal 111H and the low-voltage terminal 111L may also correspond to the voltage level of the communication signal.

When the voltage of the communication signal is a low voltage, the input semiconductor circuit element 114 may cut off the current, and the voltage at both ends of the capacitor 113 may be maintained.

Therefore, the inverter 111 may operate based on self-generated power from at least a portion of the communication signal received from the communication port 101, and even if the voltage level (high voltage) of the communication signal is changed, it may operate based on the voltage corresponding to the changed voltage level.

The level shifter 112 may convert a voltage level of an output signal of the inverter 111. For example, the level shifter 112 may operate based on IC power supplied through the power port 103, convert the voltage level (high voltage) of the output signal into a voltage corresponding to a voltage of the IC power (e.g., 2.8V, and output the converted signal through an output terminal 112*o*. A high time and low time of the signal input to the level shifter 112 may correspond to a high time and low time of the signal output from the level shifter 112. For example, the level shifter 112 may include N-type transistors 112*n*1, 112*n*2, and 112*n*3 and P-type transistors 112*p*1, 112*p*2, and 112*p*3.

Referring to FIG. 1B, according to a design, the camera module driving apparatus 1000*b* further includes at least one of an analog circuit 130, a digital controller 140, and an additional power generator 150.

The camera module driving IC 100*b* may further include a ground port 104, and a power stabilization capacitor C34 may be connected between the ground port 104 and the power port 103 outside the camera module driving IC 100*b*.

The analog circuit 130 may analogically process (e.g., amplification, analog-to-digital conversion) detection information of the position of the lens of the camera module 200, and transfer the processed result to the digital controller 140. For example, the analog circuit 130 may include a hall sensor 135 embedded in the camera module driving IC 100*b*, and the hall sensor 135 may generate lens position detection information using a hall effect.

The digital controller 140 may perform an overall digital processing operation of the camera module driver IC 100*b*. For example, the digital controller 140 may control the driver 120 based on at least a portion of a communication signal received through the interface 110. For example, the digital controller 140 may store or load autofocus control logic or optical image stabilization control logic, apply information to the control logics to perform calculations, and control the driver 120 based on the calculated result. For example, control signals output for control from the digital controller 140 may be input to gate terminals LNG, RNG, LPG, and RPG of FIG. 2C.

The additional power generator 150 may generate additional power based on the IC power VDD, and the digital controller 140 may operate based on the additional power. An optimum voltage of power required for operation of the digital controller 140 may be lower than an optimum voltage of power of the driver 120.

For example, the additional power generator 150 may include a low dropout (LDO) circuit, and generate additional power having a voltage, lower than that of the IC power supply VDD. Since the power used by the digital controller 140 may be independent of the external elements 300, it may have a fixed voltage. Therefore, since the digital controller 140 does not use the self-generated power used by the interface 110, stability of operation due to the use of the self-generated power by the interface 110 may be secured.

Figure 2B:
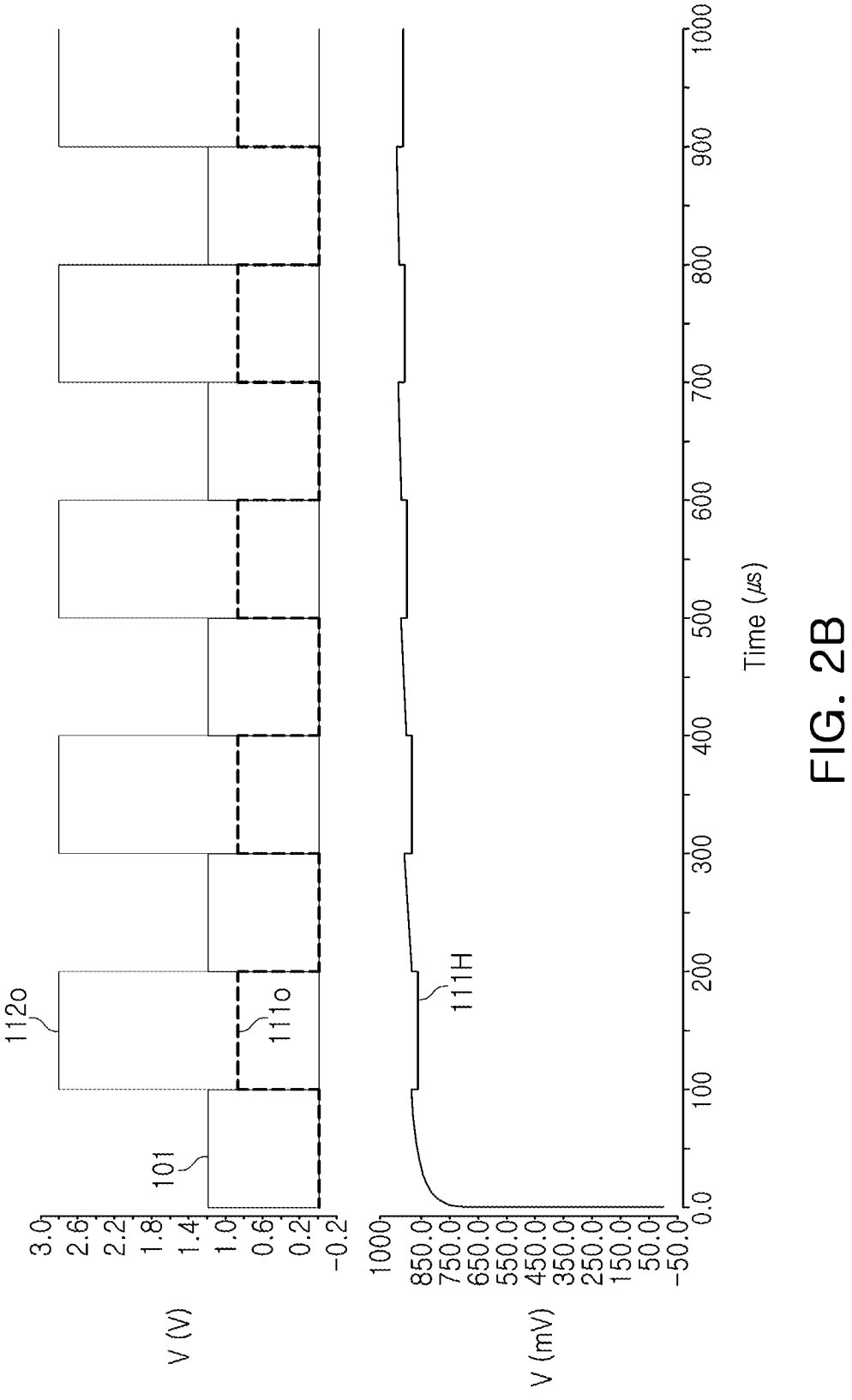
FIG. 2B is a graph illustrating voltages of nodes of an interface according to an input of at least a portion of a communication signal to the interface of FIG. 2A over time.
Figure 2C:
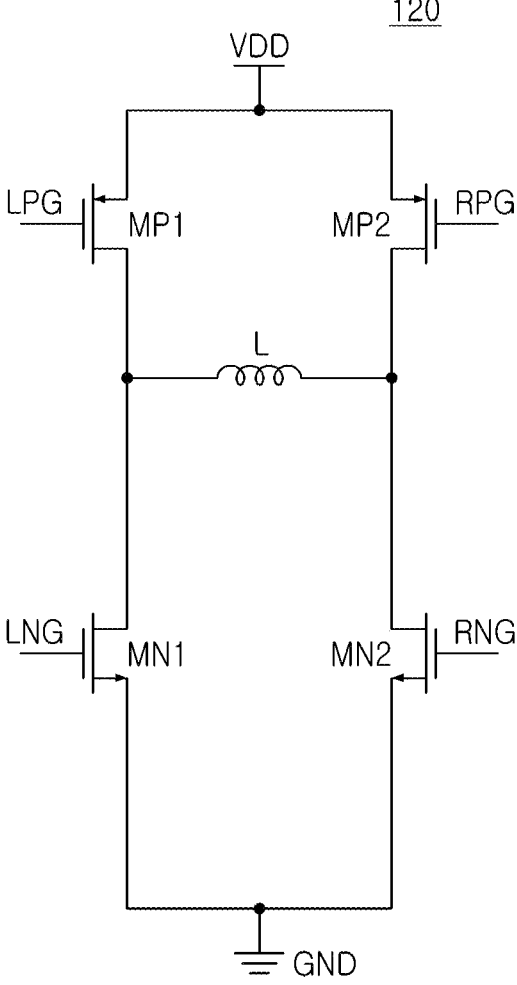
FIG. 2C is a circuit diagram illustrating a driver that may be included in an example.

Referring to FIGS. 2A and 2B, a voltage level (high voltage) of at least a portion of a communication signal received from the communication port 101 may be about 1.2V, a voltage level (high voltage) of an output signal of the output terminal 1110 of the inverter may be about 0.9V, and a voltage level (high voltage) of a signal output through the output terminal 112*o* of the level shifter may be about 2.8V.

When the time is less than 0.05 ms, the voltage of the power supplied to the high-voltage terminal 111H of the inverter may rapidly rise toward about 0.9V. When the time is 0.05 ms or later, the voltage of power supplied to the high-voltage terminal 111H of the inverter may be stabilized while converging to about 0.9V. The voltage of the power source generated by the inverter 111 itself may be lower than the voltage of the IC power that can be used by the level shifter.

Figure 3A:
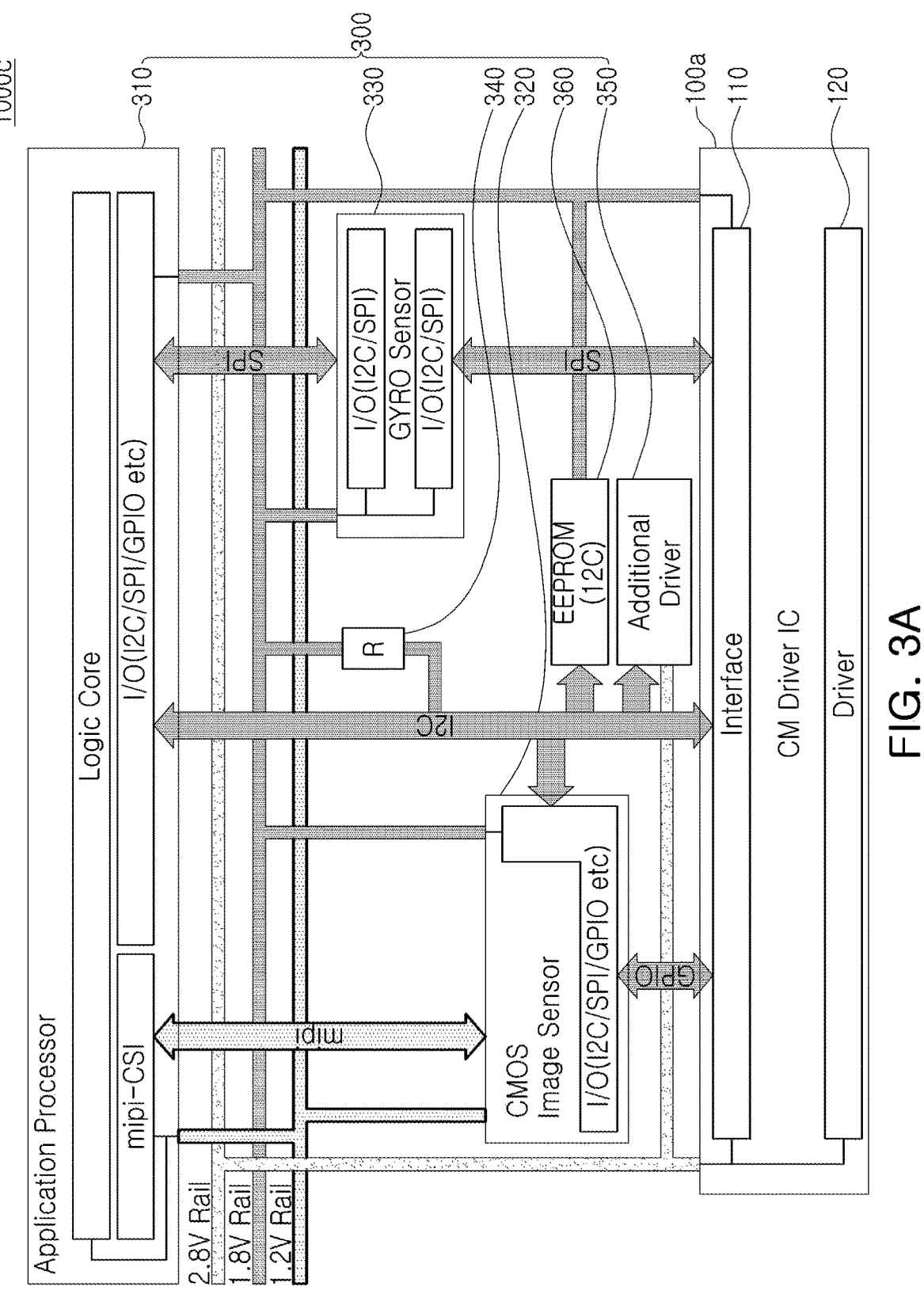
FIGS. 3A, 3B, and 3C are diagrams illustrating a device including a camera module according to an example.
Figure 3B:
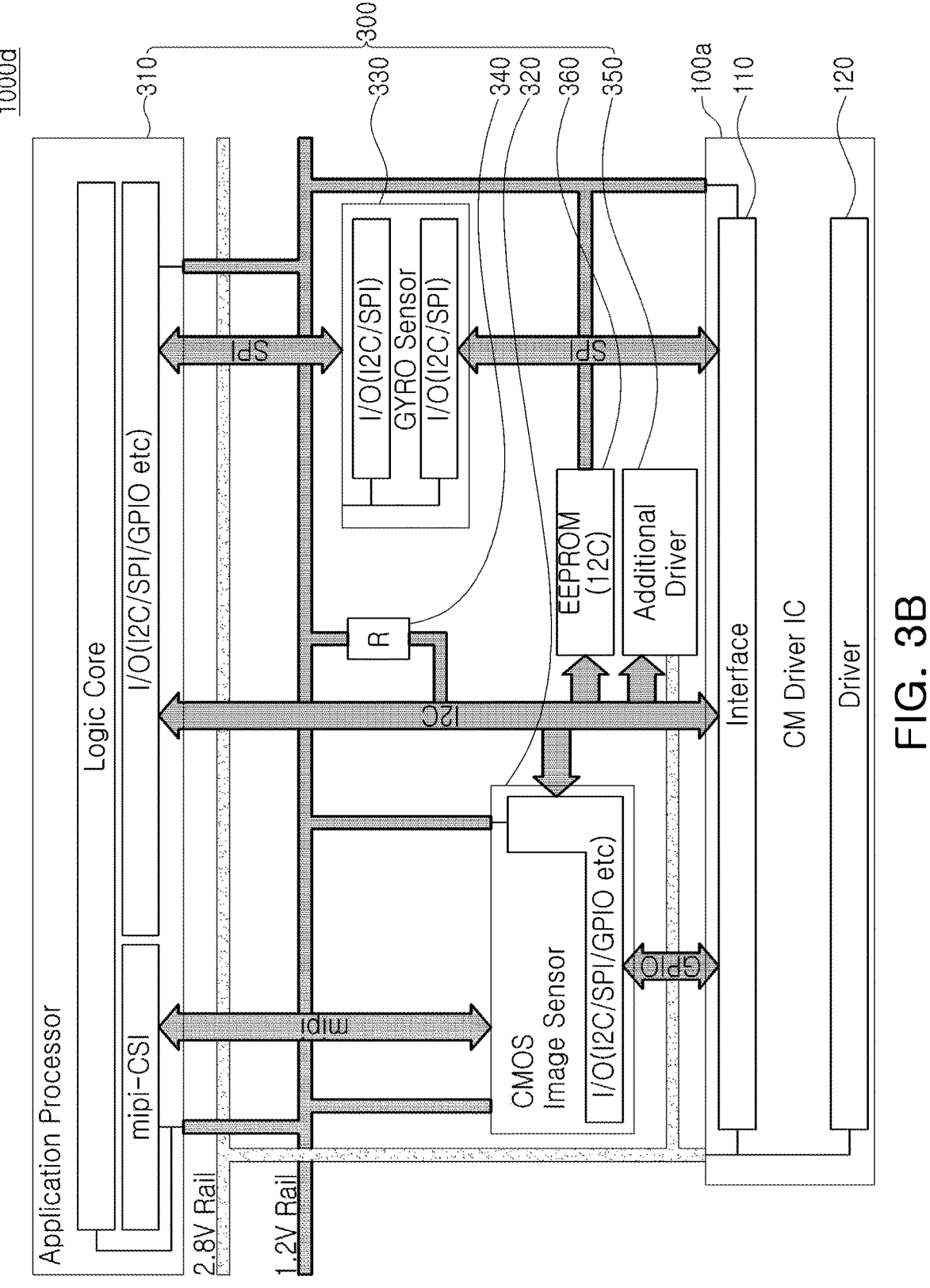
Figure 3C:
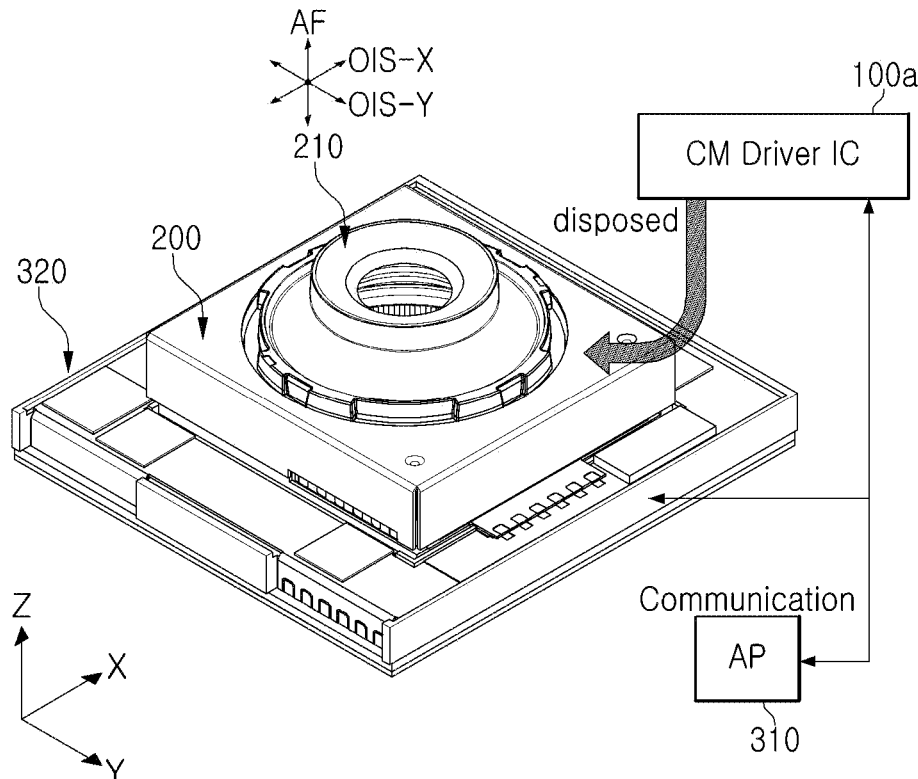

Referring to FIGS. 3A, 3B, and 3C, devices 1000*c* and 1000*d* including a camera module may include a camera module driving device including a camera module driving IC 100*a*, and may further include a camera module 200, a processor 310, and an image sensor 320.

For example, the devices 1000*c* and 1000*d* may be a vehicle, a smartphone, a personal digital assistant, a digital video camera, a digital still camera, and a network system, a computer, a monitor, a tablet, a laptop, a netbook, a television, a video game, a smart watch, an automotive, or the like, but the examples are not limited thereto.

The camera module 200 may include a lens 210, a position of which is controlled based on a driving current of the camera module driving IC 100*a*. For example, the lens 210 may be implemented as a lens module in which a plurality of lenses are arranged, may be disposed at a center of the camera module 200, and may include a permanent magnet so that a position thereof is controlled by a magnetic field. The position of the lens 210 may be controlled in a Z-axis direction by autofocus (AF) control, and may be controlled in an X-axis or Y-axis direction by optical image stabilization (OIS-X, OIS-Y) control.

For example, the camera module 200 may include a printed circuit board, and the driving coil L illustrated in FIGS. 1A and 1B may be disposed on the printed circuit board within the camera module 200. For example, the camera module driving IC 100*a* may also be disposed on the printed circuit board, and may be disposed in a position surrounded by the driving coil.

The image sensor 320 may generate an image by receiving light passing through the lens 210. For example, the image sensor 320 may include a CMOS image sensor and may include an image sensor package providing a space for disposing the CMOS image sensor. For example, the camera module 200 may be disposed on an upper surface of the Z-axis of the image sensor package, and the CMOS image sensor may be disposed between the image sensor package and the camera module 200.

At least one of the processor 310 and the image sensor 320 may transmit a communication signal to a camera module driving device including a camera module driving IC 100*a*. The camera module driving IC 100*a* may receive the communication signal through an interface 110.

The processor 310 may receive an image from the image sensor 320. For example, the processor 310 may be an application processor (AP) configured to perform a specific application in devices 1000*c* and 1000*d*. For example, the AP may be an image signal processor (ISP). Alternatively, when a scale of the devices 1000*c* and 1000*d* is relatively small, the processor 310 may be a processor for controlling an overall operation of the devices 1000*c* and 1000*d*.

Referring to FIGS. 3A and 3B, devices 1000*c* and 1000*d* including a camera module according may include an IC power system (2.8V Rail) and a first power system (1.2V Rail), and may further include a second power system (1.8V Rail) depending on the design. For example, the IC power system (2.8V Rail), the first power system (1.2V Rail), and the second power system (1.8V Rail) may be used as a path to which IC power, first power, and second power are supplied from PMIC, respectively.

For example, the IC power system (2.8V Rail) may be connected to the camera module driving IC 100*a* and an additional driver 350, and the first and second power systems (1.2V Rail and 1.8V Rail) may be connected to a processor 310, an image sensor 320, a gyro sensor 330, a pull-up resistor 340, and an electrically erasable programmable read-only memory (EEPROM) 360.

For example, communication between the camera module driving IC 100*a* and the processor 310 may be based on I2C, communication between the camera module driving IC 100*a* and the image sensor 320 may be based on GPIO, communication between the camera module driving IC 100*a* and the gyro sensor 330 may be based on SRI, and communication between the processor 310 and the image sensor 320 may be based on MIPI.

Referring to FIG. 3A, a voltage level of the communication signal based on MIPI may be 1.2V corresponding to the voltage level of the first power system (1.2V Rail), and a voltage level of the communication signal based on I2C, GPIO, and SPI may be 1.8V corresponding to the voltage level of the second power system (1.8V Rail). In this case, the voltage level of the communication signal received by the camera module driving IC 100*a* may be 1.8V.

Referring to FIG. 3B, the voltage level of the communication signal based on I2C, GPIO, SPI, and MIPI may be 1.2V corresponding to the voltage level of the first power system (1.2V Rail). In this case, the voltage level of the communication signal received by the camera module driving IC 100*a* may be 1.2V.

Whether or not the devices 1000*c* and 1000*d* including the camera module use a second power system (1.8V Rail) may vary depending on the design. Since the interface 110 of the camera module driving IC 100*a* may use self-generated power by flexibly responding to whether or not the devices 1000*c* and 1000*d* use the second power system (1.8V Rail), the camera module driving IC 100*a* may reduce the number of ports used or reduce at least a portion of a circuit, required for power of the interface 110, so that it may be advantageous to be miniaturized.

As set forth above, according to the various examples, in a camera module driving apparatus and a device including a camera module, a structure, in which power of a camera module driving IC is efficiently used, may be provided and a structure, advantageous for miniaturization of the camera module driving IC may be provided or it can efficiently cope with uncertainty of the configuration of external power of the camera module driver IC.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module driving apparatus, comprising:
a camera module driving integrated circuit (IC) including a communication port and a driving port, wherein the camera module driving IC comprises a power port configured to receive IC power;
an interface configured to receive a communication signal through the communication port in the camera module driving IC; and
a driver configured to output a driving current through the driving port in the camera module driving IC and including driving semiconductor circuit elements coupled in a bridge structure,
wherein the interface comprises:
an inverter including a high-voltage terminal, a low-voltage terminal, and an input terminal and configured to operate based on a voltage difference between the high-voltage terminal and the low-voltage terminal, and to invert at least a portion of the communication signal input from the input terminal, wherein the voltage difference between the high-voltage terminal and the low-voltage terminal is lower than a voltage difference between a voltage of the IC power of the power port and a ground; and
an input semiconductor circuit element configured to pass current from the input terminal of the inverter to the high-voltage terminal and to cut off the current from the high-voltage terminal to the input terminal,
wherein the high-voltage terminal and the low-voltage terminal of the inverter are electrically connected to both ends of a capacitor, respectively.

2. The camera module driving apparatus of claim 1, wherein the inverter is separated from the power port and configured to operate based on self-generated power from at least a portion of the communication signal.

3. The camera module driving apparatus of claim 2, wherein the interface comprises a level shifter configured to convert a voltage level of an output signal of the inverter, and
wherein the driver and the level shifter are configured to operate based on IC power supplied through the power port.

4. The camera module driving apparatus of claim 2, wherein a voltage of the self-generated power by the inverter is lower than a voltage of the IC power.

5. The camera module driving apparatus of claim 2, further comprising:
a digital controller configured to control the driver based on at least a portion of the communication signal; and
an additional power generator configured to generate additional power based on the IC power in the camera module driving IC,
wherein the digital controller is configured to operate based on the additional power.

6. The camera module driving apparatus of claim 1, wherein at least a portion of the communication signal has a pulse waveform.

7. The camera module driving apparatus of claim 1, further comprising:
a digital controller configured to control the driver based on at least a portion of the communication signal.

8. The camera module driving apparatus of claim 1, wherein the communication signal is configured based on at least one of inter-integrated circuit (I2C), serial peripheral interface (SPI), mobile industry processor interface (MIPI), and general purpose input/output (GPIO).

9. The camera module driving apparatus of claim 1, wherein the interface is configured to receive the communication signal output from at least two of a processor, an image sensor, and a gyro sensor, on an external side of the camera module driving IC.

10. A camera module driving apparatus, comprising:

a camera module driving IC including a communication port, a driving port, and a power port configured to receive IC power;

an interface configured to receive a communication signal through the communication port in the camera module driving IC; and a driver configured to output a driving current through the driving port in the camera module driving IC and including driving semiconductor circuit elements coupled in a bridge structure, wherein the interface comprises:

an inverter including a high-voltage terminal, a low-voltage terminal, and an input terminal and configured to operate based on a voltage difference between the high-voltage terminal and the low-voltage terminal, and configured to invert at least a portion of the communication signal, wherein the voltage difference between the high-voltage terminal and the low-voltage terminal is lower than a voltage difference between a voltage of the IC power of the power port and a ground; and a level shifter configured to convert a voltage level of an output signal of the inverter, wherein the driver and the level shifter are configured to operate based on IC power supplied through the power port, wherein the inverter is separated from the power port and configured to operate based on self-generated power from at least a portion of the communication signal.

11. The camera module driving apparatus of claim 10, wherein a voltage of the self-generated power by the inverter is lower than a voltage of the IC power.

12. The camera module driving apparatus of claim 10, wherein at least a portion of the communication signal has a pulse waveform.

13. The camera module driving apparatus of claim 10, further comprising:

a digital controller configured to control the driver based on at least a portion of the communication signal.

14. The camera module driving apparatus of claim 10, further comprising:

a digital controller configured to control the driver based on at least a portion of the communication signal; and an additional power generator configured to generate additional power based on the IC power in the camera module driving IC, wherein the digital controller is configured to operate based on the additional power.

15. The camera module driving apparatus of claim 10, wherein the communication signal is configured based on at least one of inter-integrated circuit (I2C), serial peripheral interface (SPI), mobile industry processor interface (MIPI), and general purpose input/output (GPIO).

16. The camera module driving apparatus of claim 10, wherein the interface is configured to receive the communication signal output from at least two of a processor, an image sensor, and a gyro sensor, on an external side of the camera module driving IC.

17. A device, comprising:

the camera module driving apparatus of claim 10;

a camera module including a lens, a position of which is controlled based on a driving current of the camera module driving apparatus;

an image sensor configured to generate an image by receiving light passing through the lens; and a processor configured to receive the image from the image sensor, wherein the camera module driving apparatus is configured to receive IC power, wherein at least one of the processor and the image sensor is configured to transmit the communication signal to the camera module driving apparatus.

18. The device of claim 17, wherein an interface of the camera module driving apparatus comprises:

an inverter including a high-voltage terminal, a low-voltage terminal, and an input terminal, and configured to operate based on a voltage difference between the high-voltage terminal and the low-voltage terminal, and to invert at least a portion of the communication signal input from the input terminal; and an input semiconductor circuit element configured to pass current from the input terminal of the inverter to the high-voltage terminal and to cut off the current from the high-voltage terminal to the input terminal, wherein the high-voltage terminal and the low-voltage terminal of the inverter are electrically connected to both ends of a capacitor, respectively.

* * * * *